US005776566A

United States Patent [19]

Mace et al.

[11] Patent Number: 5,776,566

[45] Date of Patent: Jul. 7, 1998

[54] BLOCK COPOLYMER CONTAINING COMPOSITION TO BE USED FOR AIR BAG COVERS AND AIR BAG COVERS DERIVED THEREFROM

[75] Inventors: Jean Michael Mace; Jacques Moerenhout, both of Ottingnies, Belgium

[73] Assignee: Shell Oil Company, Houston, Tex.

[21] Appl. No.: 552,400

[22] Filed: Nov. 3, 1995

[30] Foreign Application Priority Data

Nov. 4, 1994 [EP] European Pat. Off. ............ 9430145.5

[51] Int. Cl.$^{6}$ .................................................. B60R 21/16

[52] U.S. Cl. ....................... 428/34.5; 428/35.2; 428/35.4; 380/728.1; 380/743.1; 524/505

[58] Field of Search ................................ 428/35.2, 35.4, 428/34.5; 280/728.1, 728.2, 731, 728.3, 743.1; 524/505

[56] References Cited

U.S. PATENT DOCUMENTS

| | | | |
|---|---|---|---|
| 5,110,647 | 5/1992 | Sawada et al. | 428/43 |
| 5,158,322 | 10/1992 | Sun | 280/732 |
| 5,248,532 | 9/1993 | Sawada et al. | 428/35.2 |
| 5,358,986 | 10/1994 | Onofusa et al. | 524/505 |
| 5,376,461 | 12/1994 | Shiraki et al. | 428/35.2 |
| 5,445,410 | 8/1995 | Czapp et al. | 280/728.3 |

FOREIGN PATENT DOCUMENTS

| | | |
|---|---|---|
| 164740 | 6/1984 | European Pat. Off. . |
| 114964 | 8/1984 | European Pat. Off. . |
| 1016474 | 6/1984 | Japan . |
| 1016475 | 7/1984 | Japan . |
| 06100755A | 4/1994 | Japan . |
| 2250295 | 6/1992 | United Kingdom . |

*Primary Examiner*—Rena L. Dye

*Attorney, Agent, or Firm*—Donald F. Haas

[57] ABSTRACT

A block copolymer containing composition to be used for air bag covers, comprising 100 parts by weight of a selectively hydrogenated block copolymer of a monovinyl aromatic monomer and a conjugated diene, 50–250 parts by weight of a poly(olefin) resin, optionallyt 0–100 parts by weight of a filler having an average particle size of at most 50μ, and 0.25–2.5 parts by weight of antioxidant/UV stabilizer additives, and air bag covers containing the block copolymer composition.

4 Claims, No Drawings

BLOCK COPOLYMER CONTAINING COMPOSITION TO BE USED FOR AIR BAG COVERS AND AIR BAG COVERS DERIVED THEREFROM

FIELD OF THE INVENTION

The present invention is relating to a block copolymer containing composition to be used for air bag covers and to air bag covers derived therefrom. More in particular the invention is relating to a block copolymer containing composition, comprising a selectively hydrogenated block copolymer, having at least two terminal poly(monovinyl aromatic) blocks and at least one intermediate poly (conjugated diene) block and a poly(olefin) resin and one or more additives.

BACKGROUND OF THE INVENTION

Block copolymer containing composition, comprising a selectively hydrogenated block copolymer, having at least two terminal poly(monovinyl aromatic) blocks and at least one intermediate poly(conjugated diene) block and a poly (olefin) resin and one or more additives, were known from e.g. the British patent application no. 2250295 disclosing block copolymer compositions for an air bag cover, which is a molded cover obtained by injection molding, said compositions comprising (a) a hydrogenated styrene and conjugated diene block copolymer between 30 parts by weight and 55 parts by weight and obtained by hydrogenating a block copolymer composed of at least two polymer blocks including styrene units as a main part thereof, and at least one polymer block including conjugated diene units as a main part thereof, a content of the styrene in the copolymer being between 20% by weight and 40% by weight and an number-average molecular weight of the copolymer being $10^5$ or more;

(b) a plasticizer to be used for a rubber, at between 25 parts by weight and 50 parts by weight;

(c) an olefin group resin at between 15 parts by weight and 30 parts by weight;

(d) an additive of 5 parts by weight or less;

wherein (a)+(b)+(c)=100 parts by weight.

Preferably the conjugated diene was butadiene and the plasticizer was a paraffin group oil,while the olefin group resin was a polypropylene. The additive mentioned might be an antioxidant, heat and/or light stabilizer.

The composition was indicated to show a hardness of between 60 and 85 according to JISK 6301 Tyep A. The air bag cover should have a portion having a fragile structure to be broken when the air bag is expanded.

Due to in particular the prescribed installation of passenger air bags as standard equipment and the required integration of air bag modules in the dash board of modern automotive versions, the filled polypropylene blends as previously used in the automotive dash board applications, for providing enhanced stiffness over unfilled polypropylenes, became unsuitable, because of their brittle failure upon inflation under air bag module explosion test conditions at −40° C.

Alternative materials, already known in the air-bag cover area (like some polyetheresters) display flexural moduli up to 400 MPa only, which made the use of such materials for dash-board integrated covers for air bag modules very difficult or almost impossible without the use of complicated molding design.

It will be appreciated that the satisfaction of the six requirements as mentioned in pages 4 and 5 of the hereinbefore discussed British patent application no. 2250295, by the presently used compositions is to be further improved and in particular the requirements of retained mechanical properties (prevention of brittleness and reliability of the expansion of the cover over a large temperature area from −40° C. to +90° C.) and of decreasing the cost of manufacturing the cover, which is especially important with regard to an air bag apparatus used in cars made by mass production.

More recent efforts in this air bag cover area were disclosed in e.g. Japanese patent applications nos. 6 116 47, 6 116 475, 6 100 755 and 6 100 754 disclosing elastomer compositions to be used for air bag covers.

More in particular the Japanese patent application no. 6 116 474 disclosed elastomer compositions comprising (a) 100 parts of a modified (acid grafted) selectively hydrogenated block copolymer or a blend thereof with non modified hydrogenated block copolymer, (b) 10 to 300 parts by weight of paraffinic oil, (c) 5 to 250 pts by weight of non crystalline olefin resin or its blend with crystalline olefin resin having a thermal deformation temperature of above 90° C. in a blend ratio of 25:75 or higher by weight, and either (d) 5 to 100 parts by weight of ethylene-alpha olefin copolymer rubber and/or ethylene-alpha-olefin-non conjugated diene copolymer rubber having a glass transition point of below −30° C.; or (e) 10 to 150 parts by weight of thermoplastic elastomer with an embrittle temperature of below −50° C. consisting of a blend of dynamically vulcanized ethylene-alpha olefin-non conjugated diene copolymer rubber and polyolefin resin.

The Japanese patent application no. 0 611 475 disclosed elastomer compositions comprising (a) 100 parts by weight of a modified (acid grafted) selectively hydrogenated block copolymer or its blend with hydrogenated block copolymer, (b) 10 to 300 parts by weight of paraffinic oil, (c) 5 to 100 parts by weight of a non crystalline olefin resin and/or crystalline olefin resin having a thermal deformation temperature of above 90° C., (d) 5 to 100 parts by weight of thermoplastic resin selected from polyamide resin and saturated polyester resin, and (e) 10 to 150 parts by weight of thermoplastic elastomer consisting of a blend of dynamically vulcanized ethylene-alpha olefin non-conjugated diene (EPDM) copolymer rubber and polyolefin resin.

Japanese patent application no. 0 6100 754 disclosed a composition, comprising (a) 100 parts by weight of a hydrogenated block copolymer, comprising at least two terminal poly (aromatic vinyl compound) block and an intermediate block predominantly composed of conjugated diene, which has a spring hardness of less than 99 (JIS K 6301), (b) 10–300 parts by weight of a paraffin oil, (c) 5–100 parts of a non-crystalline olefin resin and/or a crystalline olefin resin, having thermal deformation temperature higher than 90° C., (d) 5–100 parts by weight of a polystyrene resin, (e) 5–50 parts by weight of a polyphenylene ether resin being a homo-polymer or co-polymer and having a reduced viscosity of 0.150–0.70 (in solution of 0.5 g/dl in chloroform at 30° C.), and (f) 10 to 150 parts by weight of a thermoplastic elastomer consisting of a non conjugated diene copolymer of ethylene-alpha olefin and a poly(olefin) resin, which is dynamically vulcanized and has a brittle point of lower than −5° C.

Japanese patent application no. 06100755 disclosed a composition of elastomer, comprising (a) 100 parts by weight of a block copolymer comprising at least two poly(aromatic vinyl compound) endblocks and at least one intermediate block of conjugated diene as main component, which has a spring hardness of less than 99 (JIS K 6301), (b) 10–300 parts by weight of a paraffin oil, (c) 5–100 parts by weight of a non-crystalline olefin resin and/or crystalline olefin resin, having thermal deformation temperature of higher than 90°0 C., (d) 5–100 parts by weight of a polystyrene resin, (e) 5–50 parts by weight of a polyphenylene ether resin as homo-polymer or co-polymer, having reduced viscosity of 0.15 to 0.70 (solution of 0.5 g/dl in chloroform at 30° C.), and (f) 10–100 parts by weight of a rubber composed of a copolymer of ethylene-alpha olefin and/or non-conjugated diene copolymer of ethylene-alpha olefin and polyolefin resin.

It will be appreciated from the hereinbefore discussed Japanese patent application, that recent research efforts have been directed to further improvements possibly to be reached by means of compositions, comprising a relatively large number of different polymer constituents which is unattractive from a viewpoint of manufacturing costs and of the possibility of efficient recycling.

It was an object of the present invention to provide an air bag cover, which forms an integrated part of automotive dashboards, which can be produced at low cost and which must show the presently required inflation behavior at temperatures from −35° to 85° C. and must have an as light as possible weight. Another object of the present invention was to provide a composition, which may enable the manufacture of the hereinbefore mentioned air bag covers and which should comprise an as simple as possible number and type of different ingredients.

As a result of extensive research and experimentatoin such a composition aimed at was surprisingly found now.

SUMMARY OF THE INVENTION

Accordingly the present invention includes a block copolymer containing composition to be used for air bag covers, comprising 100 parts by weight of a selectively hydrogenated block copolymer, 50–250 parts by weight of a poly(olefin) resin, optionally 0–100 parts by weight of a filler having an average particle size of at most 50 μ, and 0.25–2.5 parts by weight of antioxidant/UV stabilizer additives.

DETAILED DESCRIPTION OF THE INVENTION

The present invention includes a block copolymer containing composition to be used for air bag covers, comprising:

(a) 100 parts by weight of a selectively hydrogenated block copolymer, comprising at least two end blocks of predominantly monovinyl aromatic monomers and at least one intermediate block of predominantly conjugated diene, the predominantly poly(conjugated diene) blocks in which have been selectively hydrogenated up to an residual ethylenic unsaturation degree of 20% or less of the original ethylenic unsaturation, whereas the aromatic unsaturation has retained at least 95% of its original value, and having a monovinyl aromatic compound content in the range of from 5 to 50%, and preferaly from 10 to 35%, (b) 50–250 parts by weight of a poly(olefin) resin, (c) 0–100 parts by weight of a filler having an average particle size of at most 50 μ and preferably from 1–15 μ, and (d) 0.25–2.5 parts by weight of antioxidant/UV stabilizer additives.

The hereinbefore specified compositions have been found to show a combination of high stiffness (flexural moduli in the range from 400 to 750 and preferably from 450 to 700 mpa could be obtained) and a fully satisfactory inflation behavior of the air bag modules over a temperature range of from −35° C. to +85° C. and shored hardness. In comparison, the flexural moduli of prior art compositions intended for the same purpose were reported to be at most 400 MPa. Moreover simply constructed air bag covers appeared to be efficiently manufactured by a single injection molding process, starting from a simple set of ingredients.

With the term predominantly polymonovinylaromatic monomers and predominantly conjugated diene and predominantly poly(conjugated diene) blocks as used throughout this specification, reference is made to blocks, which have been derived from substantially pure monomer or from monomer mixture, comprising a major proportion of the specified monomer and a minor amount (up to 10 wt %) of a structurally related comonomer or a structurally different comonomer and in particular that one used for the other block type.

The monovinylaromatic monomer as a major component in the predominantly poly(monovinylaromatic) blocks and optional as minor component in the blocks of the other type, may be selected from styrene, alpha-methylstyrene, o-methylstyrene p-ethylstyrene, p-tert-butylstyrene, 1,3-dimethyl styrene or mixtures thereof. Styrene is the more preferred monomer and will most preferably be used as substantially pure monomer.

The conjugated diene to be used as major ingredient in the predominantly poly (conjugated diene) blocks is 1,3-butadiene and/or 2-methyl-1,3-butadiene (isoprene), which can be mixed with minor amounts of 2,3-dimethyl 1,3-butadiene; 1,3-pentadiene,1,3-hexadiene or mixtures thereof.

The monovinylaromatic main monomer also may be mixed with small amounts of one or more of the hereinbefore specified conjugated dienes, while the conjugated diene main monomer may also be mixed with one or more of the hereinbefore specified monovinyl aromatic monomers.

Preferred block copolymers are of the type ABA or $(AB)_n$ X, wherein A represents a predominantly poly (monovinylaromatic) block, wherein B represents a predominantly poly(conjugated diene) block, and wherein X represent the residue of a coupling agent that joins n linear segments, n being an interger from 2 to 20.

The blocks A preferably have been derived from substantially pure styrene and the blocks B preferbly have been derived from substantially pure butadiene or isoprene.

In the case of poly(butadiene) blocks the content of 1,2 polymerised 1,3-butadiene is in the range of from 20 to 65% and preferably from 30 to 45%.

The number average molecular weight of each of the predominantly poly(monovinyl aromatic) blocks as determined by gel permeation chromatography (GPC) is in the range of from 5,000 to 50,000, preferably in the range of from 7,000 to 35,000, and more preferably from 10,000 to 20,000.

The predominantly poly(conjugated diene) blocks may have a number average molecular weight by GPC in the range of from 30,000 to 150,000, preferably from 40,000 to 120,000, and more preferably from 50,000 to 90,000.

Suitable examples of such block copolymers are KRATON G 1651 and KRATON G 1654. (KRATON is a trademark).

The polyolefin resin as used as component (b) may be selected from the group consisting of random copolymers and/or block copolymers of two or more α-olefins, having 2 to 10 carbon atoms and preferably from 2 to 6 carbon atoms, and optionally comprising other comonomers, and having a melt flow rate in the range of from 1.0 to 10.0 g/10 min at 230° C. and 2.16 kg.

Preferably random copolymers of propylene, ethylene, and/or butylene, having a melt flow rate of from 1.0 to 6.0 g/10 min and preferably from 1.3 to 1.7 g/10 min at230° C. and 2.16 kg, are applied as component b.

Examples of such copolymers are HMA 6100 and those of the CATALLOY range. It was surprisingly found that blends of commercial pure polypropylene grades comprising the same ingredients (c) could not successfully be applied for said purpose.

The filler to be used as component c may be selected from talc such as EMTAL 41, TALCLUZENAC DOS, calcium carbonate such as DURAMITE, clay such as McNAMEECLAY, calcium metasilicate such as WALLOSTONITE, silicon dioxide such as IMSIL A-10 or GOLD BOND R, sodium potassium aluminum silicate such as MINEX-7, aluminium trihydrate, titanium dioxide such as TR 900, carbon black such as RAVEN H20 or pyrogenic microspheres processed from fly ash such as ORBALOID.

Of this group talc and calcium carbonate are preferred, of which talc is the most preferred. The amount of these preferred fillers is preferably n the range from 20 to 80 parts by weight per 100 parts by weight of block copolymer and more preferably in the range of from 25 to 75 parts by weight per 100 parts by weight of block copolymer. EMTAL, TALCLUZENAC, McNAMEE CLAY, DURAMITE, IMSIL, GOLD BONDR, MINEX, TR900 RAVEN H-20 and/or BALOID are trade marks The additives to be used as component (d) may primarily consist of antioxidant/UV stabilizers in an amount of from 0.25 to 2.5 parts by weight per 100 parts by weight of the block copolymer.

Examples of such stabilizers are those selected from the IRGANOX and/or SUMILIZER and/or TINUVIN series, such as IRGANOX 1010 AND TINUVIN 327 (IRGANOX, SUMILIZER and TINUVIN are trademarks).

Preferred amounts of the additives are in the range of from 0.6 to 0.8 parts by weight per 100 parts by weight of block copolymer. More preferably a combination of IRGANOX 1010 and TINUVIN 327 in a weight ratio of 2:1 is used.

The compositions according to the present invention may be prepared by methods known per se, such as dry-blending of all ingredients and subsequent compounding using a twin-screw co-rotating extruder. The obtained extrudate can be cooled in a cold water bath and subsequently granulated. The granulates can be injection molded.

It will be appreciated that the final blend properties will not depend on the successive introduction of the ingredients during blend preparation.

Although there occurred references in general terms to the use of fillers such as glass fibres, talk, calcium carbonate, silica, mica, clays, aluminum silicates, ground feldspar, titanium dioxide, aluminum tri-hydrate, carbon black in blends for multi layered air bag covers, in e.g. the French patent no. 2655908 and U.S. Pat. Nos. 5,158,322, 5,248,532 and 5,110,647 there was not any teaching at all in these documents to a person skilled in the art how to reach the attractive properties of the polymer compositions and the relatively simple constructions of airbag covers according to the present invention.

It wil be appreciated that all said four patent publications were actually relating to an air bag cover two layer system, comprising a soft surface skin layer containing a hydrogenated styrene butadiene block copolymer containing blend and a rigid core layer comprising one or more poly(olefin) resin and having a portion for easily bursting the cover upon initiation of the air bag operation.

The present invention is further illustrated by the following examples, however without restriction of its scope to these specific embodiments.

EXAMPLES

Blends were prepared from the ingredients as listed in Table I, by first dry blending all ingredients and subsequently compounding using a Werner and Pflerderer 25K twin-screw corotating extruder.

Actual temperature settings of the extruder were along the pathway from 170° C. 215° C. to 170° C., at 250 rpm, around 60% torque and 9.9 kg/hour feeding rate. The extrudate was cooled in a water bath and subsequently granulated. All the compounds were subsequently injection moulded into 150×150×2 mm test plates using a DEMAG D150 injection moulding machine. Injection mouldings setting have been listed in Table II.

Passenger side air bag covers were made by one shot injection molding. The mold design contained in the front surface a very thin tearing line on three sides, the last side being available for a built-in hinge. On the sides of the cover "box" series of holes were designed for the fixation rivets of the cover to the module.

All experimental test data as well as the test methods have been listed in Table III.

The physical properties and inflation behaviour of the three KRATON G block copolymer comprising compositions were compared with a standard talc filled polypropylene (homopolymer) which was earlier tried out as starting blend for industrial scale air bag cover manufacture, but displayed brittle failure at −35° C. which was regarded as unacceptable for this application.

The actual air-bag covers were fitted onto modules and fired according to usual standard inflation test procedures at three different temperatures −35° C., +23° C. and +85° C. During inflation, the pressure inside the modules were recorded as well as the type of breaking behaviour (ductile, or brittle with flying pieces) and hinging behaviour.

TABLE I

Formulations of compounds

| Reference nbr<br>Formulation (in phr) | A | B | C |
|---|---|---|---|
| KRATON G-1654 elastomer | 100 | 100 | 100 |
| PP (HMA 6100, MI 1.5) | 75 | 125 | 200 |
| Talc (LUZENAC OOS) | 50 | 50 | 50 |
| IRGANOX 1010 | 0.25 | 0.25 | 0.25 |
| TINUVIN 327 | 0.5 | 0.5 | 0.5 |

TABLE II

| DEMAG D150 injection moulding conditions | | | | |
|---|---|---|---|---|
| Formulation number | | A | B | C |
| Temperatures | °C. | | | |
| Intake zone | | 35 | 35 | 35 |
| Cylinder heating zone 1 | | 170 | 180 | 180 |
| Cylinder heating zone 2 | | 200 | 210 | 210 |
| Cylinder heating zone 3 | | 225 | 225 | 220 |
| Nozzle heating | | 225 | 230 | 230 |
| Melt | | 225 | 230 | 230 |
| Mold | | 55 | 55 | 55 |
| Injection time | s | 1.5 | 1.6 | 2.0 |
| Injection Pressure | bar | 150 | 135 | 125 |
| Holding pressure time | S | 4.0 | 4.0 | 4.0 |
| Holding pressure | bar | 90 | 90 | 90 |
| Back pressure | bar | 25 | 25 | 25 |
| Injection Speed | % | 95 | 80 | 80 |

TABLE III

Mechanical properties and inflation performances

| Formulation nbr<br>Property measured | Method used | A | | B | | C | | PP (20% Talc) |
|---|---|---|---|---|---|---|---|---|
| Density | Calculated | 1.074 | | 1.039 | | 1.007 | | 1600 |
| Shore D hardness | ASTM D2240 | 47 | | 53 | | 56 | | |
| Flexural modulus, MPa | ISO 178 | 440 | | 640 | | 710 | | |
| | | md | pmd | md | pmd | md | pmd | |
| Tensile strength, MPa | ASTM D412 | 21 | 32 | 24 | 33 | 21 | 30 | >50 |
| Elongation at break, % | | 480 | 580 | 470 | 590 | 460 | 590 | |
| Tensile modulus 100%, MPa | | 11.5 | 9.0 | 15.0 | 12.5 | 16.0 | 14.0 | |
| Tear Strength, kN/m | | 100 | 100 | 120 | 115 | 135 | 125 | |
| Izod impact, Room T$^{re}$, kJ/m$^2$ | ISO 180 | N.B. | | N.B. | | N.B. | | N.B. |
| Izod impact, −35° C., kJ/m$^2$ | | N.B. | | N.B. | | 27.5 (P) | | |
| Inflation behaviour: | | | | | | | | |
| at +85° C. | | PASS | | PASS | | PASS | | PASS |
| at +23° C. | | PASS | | PASS | | PASS | | PASS |
| at −35° C. | | PASS | | PASS | | PASS | | FAIL |

md mold direction.
pmd prependicular to the mold direction.
N.B. No break, as described in ASTM D 256.
P. Partical break, as described in ASTM D256.
PASS Satisfactory opening and hinging of the lid.
FAIL Fragile break of the lid, with shattering.

We claim:

1. Air bag cover comprising a block copolymer containing composition, the block copolymer composition having a flexural modulus in the range of 450 to 700 MPa and containing no oil, said composition comprising:

100 parts by weight of a selectively hydrogenated block copolymer, comprising at least two end blocks of predominantly monovinyl aromatic monomers and at least one intermediate block of predominantly conjugated diene, the predominantly poly(conjugated diene) blocks in which have been selectively hydrogenated up to a residual ethylenic unsaturation degree of 20% or less of the original ethylenic unsaturation, whereas the aromatic unsaturation has retained at least 95% of its original value, and having a monovinyl aromatic compound content in the range of from 5 to 50%;

50–250 parts by weight of a poly(olefin) resin;

from 20 to 80 parts by weight of a filler having an average particle size of at most 50; and 0.25–2.5 parts by weight of antioxidant/UV stabilizer additives.

2. The air bag cover of claim 1, wherein the block copolymer containing composition contains substantially pure poly(styrene) blocks and substantially pure poly(butadiene) blocks.

3. The air bag cover of claim 1, wherein the block copolymer containing composition has a number average molecular weight for each of the predominantly poly (monovinylaromatic) blocks in the range of from 10,000 to 20,000, and the number average molecular weight for each of the poly(conjugated diene) blocks is in the range of from 50,000 to 90,000.

4. The air bag cover of claim 1, wherein the block copolymer containing composition comprises a polyolefin resin selected from copolymers of propylene, ethylene, or butylene, the copolymers having a melt flow rate of from 1.3 to 1.7 g/10 min at 230° C. and 2.16 kg, and from 20 to 80 parts by weight of talc per 100 parts by weight of the block copolymer.

* * * * *